United States Patent
Smith

(10) Patent No.: US 7,695,547 B2
(45) Date of Patent: Apr. 13, 2010

(54) DESICCANT

(75) Inventor: James Hart Smith, Woodside, CA (US)

(73) Assignee: Seagate Technologies, LLC, Scotts Valley, CA (US)

( * ) Notice: Subject to any disclaimer, the term of this patent is extended or adjusted under 35 U.S.C. 154(b) by 288 days.

(21) Appl. No.: 11/709,182

(22) Filed: Feb. 21, 2007

(65) Prior Publication Data

US 2008/0196591 A1    Aug. 21, 2008

(51) Int. Cl.
*B01D 53/02*    (2006.01)

(52) U.S. Cl. .......................... 95/117; 96/108; 55/385.6; 360/97.02

(58) Field of Classification Search .................... 95/117; 96/108; 55/385.6; 360/97.02
See application file for complete search history.

(56) References Cited

U.S. PATENT DOCUMENTS

| | | | | |
|---|---|---|---|---|
| 3,669,103 A | | 6/1972 | Harper et al. ............... 128/156 |
| 3,810,468 A | | 5/1974 | Harper et al. ............... 128/156 |
| 4,620,248 A | * | 10/1986 | Gitzendanner ........... 360/97.02 |
| 4,656,222 A | * | 4/1987 | DeFazio ..................... 524/801 |
| 4,707,290 A | * | 11/1987 | Seiter et al. ................. 510/443 |
| 4,783,510 A | * | 11/1988 | Saotome .................. 525/329.7 |
| 4,808,637 A | * | 2/1989 | Boardman et al. ......... 521/50.5 |
| 4,888,308 A | * | 12/1989 | Adams et al. ................. 501/11 |
| 4,959,061 A | | 9/1990 | Cabestany .................. 604/368 |
| 5,124,856 A | * | 6/1992 | Brown et al. ............. 360/97.03 |
| 5,506,035 A | | 4/1996 | Van Phan et al. ............ 428/196 |
| 5,743,942 A | * | 4/1998 | Shelley et al. ................. 96/118 |
| 5,795,439 A | * | 8/1998 | Euripides et al. ............ 162/100 |
| 6,059,860 A | * | 5/2000 | Larson ........................ 95/117 |
| 6,110,533 A | | 8/2000 | Cote et al. ................... 427/341 |
| 6,399,730 B1 | | 6/2002 | Freeman et al. ............. 426/310 |
| 6,703,451 B2 | | 3/2004 | Hosokawa et al. .......... 525/340 |
| 2003/0235664 A1 | * | 12/2003 | Merical et al. ............. 428/35.7 |
| 2006/0086813 A1 | * | 4/2006 | Beatty et al. ............... 236/44 A |

OTHER PUBLICATIONS

Donna Narsavage-Heald, *Thermal Polyaspartate as a Biodegradable Alternative to Polyacrylate and Other Currently Used Water Soluble Polymer*, Scranton Green Chemistry, 2005, pp. 1-6, Jul. 2005.

\* cited by examiner

*Primary Examiner*—Robert J Hill, Jr.
*Assistant Examiner*—Christopher P Jones
(74) *Attorney, Agent, or Firm*—Campbell Nelson Whipps, LLC

(57) ABSTRACT

A desiccant comprises a mixture of a polymeric salt and a nonpolymeric salt.

16 Claims, 4 Drawing Sheets

DESICCANT

BACKGROUND

Control of relative humidity (RH) is desirable in a variety of areas.

Within an electronic instrument it is desirable to control internal RH since the moisture within an instrument may affect performance and reliability. One such example is a disc drive. Control of the moisture or relative humidity within the housing that encloses the disc drive is important since moisture may affect the performance and reliability of the head/disc interface such as head-to-disc disc stiction. High moisture may increase media corrosion. Excessive disc wear has been observed under conditions of low relative humidity. Thus humidity control over an extended period of time within a moisture range is desirable.

Desiccants are used to control relative humidity in a number of situations. One category of desiccants includes polymeric desiccants. Polymeric desiccants are widely used to absorb water in liquid form in diapers and sanitary napkins. Such polymeric desiccants can absorb water many times their own weight and typically are referred to as superabsorbents since their purpose is to absorb as much water as possible. Such prior art superabsorbents are useful for a single cycle absorption of water.

In protecting the electronic instruments from humidity, a desirable desiccant should be able to withstand many absorption-desorbption cycles while still maintaining humidity control over the life of the instrument. Carbon-silica gel desiccants are presently used to maintain humidity control in electronic instruments.

SUMMARY

The present invention includes a desiccant comprising a mixture of super adsorbent polymeric salt and a nonpolymeric salt, each salt having the same cation.

DETAILED DESCRIPTION OF ILLUSTRATIVE EMBODIMENTS

The desiccant of the present invention includes a mixture of a polymeric salt and a nonpolymeric salt that maintains its adsorptive properties from changing even after repeated adsorption-desorption cycles. Being able to maintain adsorptive properties after repeated adsorption-desorption cycles is important in the context of an electronic instrument since the instrument once built and in use is not easily disassembled or is sealed. To replace the desiccant in either situation is either inconvenient or replacement cannot be done.

Figure 1:
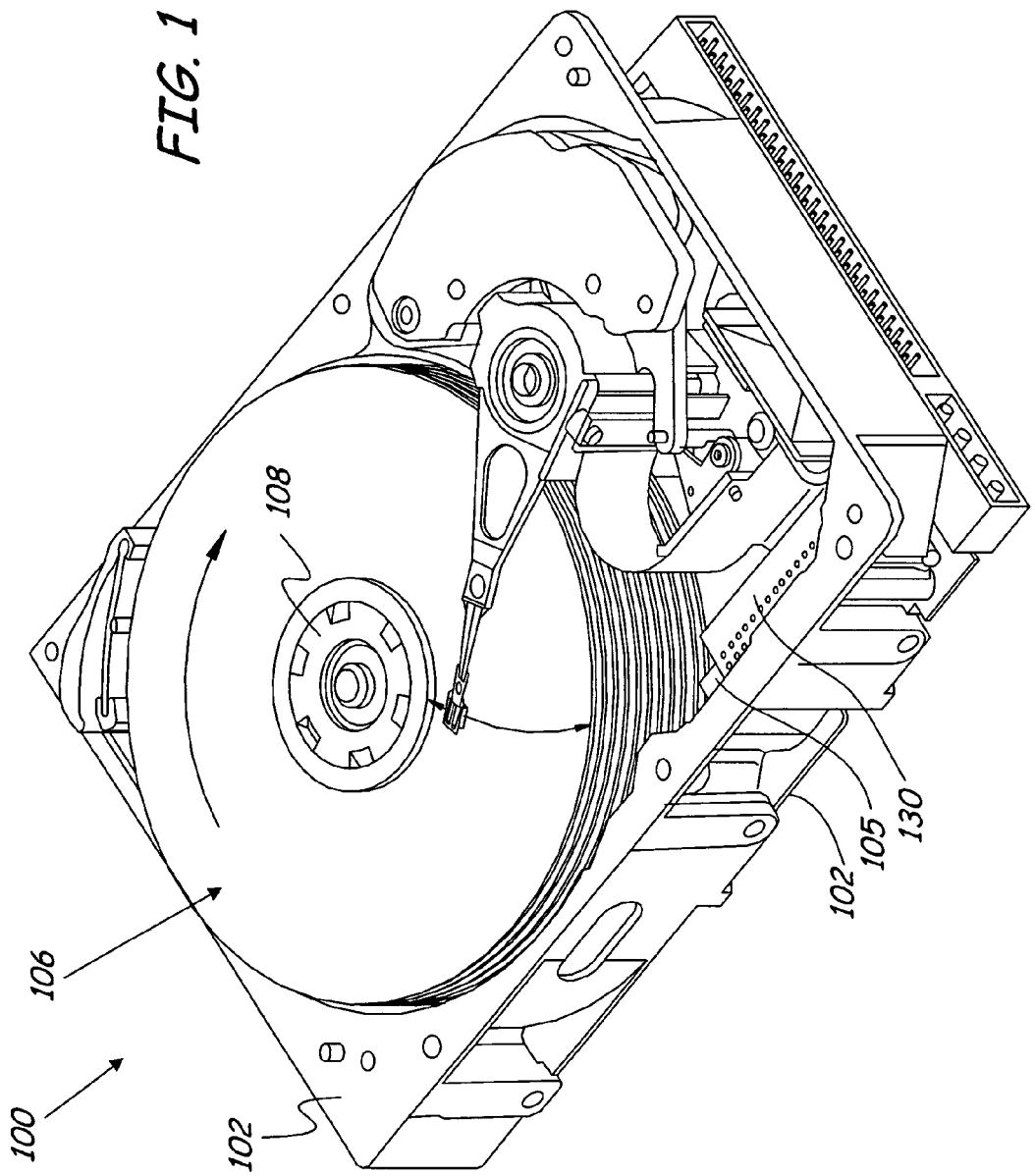
FIG. 1 is a perspective view of a disc drive of the present invention.

One example of an instrument in which the desiccant of the present invention may be used is a disc drive generally indicated at 100 in FIG. 1. Although a disc drive is illustrated, the desiccant of the present invention can be employed in any enclosed system in which humidity control is desired. The disc drive 100 includes a housing with a base 102 and a top cover (not shown) that closes the housing to form an enclosed assembly. The housing 102 may include a breathing hole (such as 104) that is sealed with a porous filter that allows air and humidity to move in and out of the disc drive 100 as temperature or atmospheric pressure changes. It should be noted that some embodiments of disc drives, with which embodiments of the present invention are also useful, are hermetically sealed and therefore do not include a breathing hole. The disc drive 100 further includes a disc pack 106, which is mounted on a spindle motor (not shown) by a disc clamp 108. The disc drive 100 also includes a device 105 in which the desiccant of the present invention is contained for maintaining relative constant humidity conditions inside the drive 100. Outside air may pass through the device 105 thereby removing excess humidity or the desiccant may only be exposed to the inside of the drive.

The desiccant of the present invention maintains humidity at a selected or predetermined level. This is a primary difference between the desiccant of the present invention and desiccant such as silica gel which tends to remove moisture from the air without regard to maintaining a desired relative humidity level. A desiccant such as silica gel will remove moisture until all the moisture is removed or until the silica gel can no longer adsorb any moisture.

There are numerous uses in which the desiccant of the present invention is useful for maintaining a selected or desired relative humidity and maintaining that relative humidity over many absorption-desorption cycles. The desiccant of the present invention is useful in maintaining a selected relative humidity range in indoor climate control situations. Maintaining humidity at a substantially constant level will in certain situations reduce the need for air conditioning and ventilation.

Many electronic components used in the semi-conductor industry are sensitive to high humidity. A high relative humidity will reduce the service life span of the electrical component. To maintain a healthy and prolonged shelf life of semi-conductor components, storage of such components may require a level of humidity in the range of 20 to 55%. Clean rooms for an electronic component production facility need relative humidity levels of between 40 to 60%. The desiccant of this invention is suitable for maintaining such humidity levels.

Control of relative humidity is an important aid for food storage, wine storage and storing other perishable goods in which too low of a moisture will deteriorate the product or cause the product to deteriorate and too high of a moisture level will do the same.

Production of pharmaceuticals in tablet and/or powder form require good control of humidity since such tablets and powdered pharmaceuticals are highly sensitive to moisture. Pharmaceuticals in powder form may "cake". "Caking" is the lumping of the powder and may render an entire production of such pharmaceutical useless waste. In addition, coating of medicinal tablets requires good control of relative humidity to ensure that tablet coatings and gelatin capsules dry properly.

The desiccant of the present invention is also useful to control humidity in museum displays, art collections, storage of old manuscripts, archives, and libraries where passive indoor climate control by maintaining humidity at a substantially constant level is needed.

Indoor molds develop in high moisture environments. Control of the relative humidity using the desiccant of this invention may reduce, if not eliminate, such mold growth.

A polymeric desiccant is defined as a long chain molecule made of repeating units that react with one another to form the long chain molecule and that has water adsorptive properties.

A nonpolymeric desiccant is either an organic or inorganic molecule that do not contain such repeating units and thus do not form long chain molecules. For purposes of this application a salt is defined as the reaction product of when a metal cation displaces the hydrogen of an acidic functional group.

Figure 2:
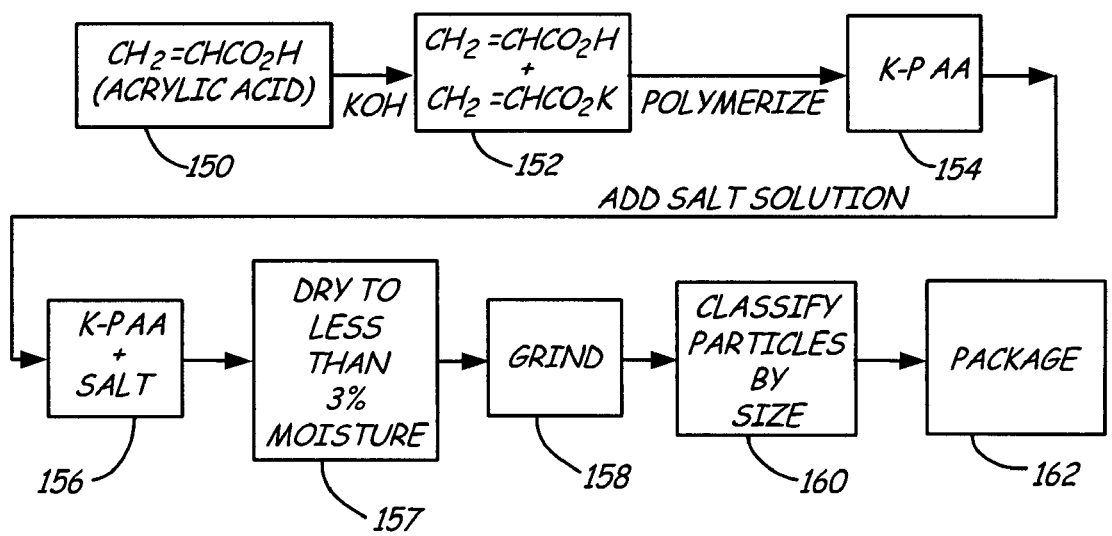
FIG. 2 is a flow diagram of a process to form the desiccant.

Suitable polymeric desiccants for use in the present invention have acidic functional groups, whether prior to or during formation of the polymer or after the polymer is formed, that react with a base to form a salt. One example of a suitable polymer useful in this invention is polyacrylic acid (PAA) or a mixed polyacrylic acid/polyacrylamide polymer. A base is used to produce the salt of PAA. The PAA of this invention is synthesized by first partially neutralizing acrylic acid with a base such as LiOH, NaOH, or KOH as illustrated in FIG. 2 at 150 and 152. The mixture is then polymerized to form the PAA salt 154.

The PAA salt and the nonpolymeric salt are combined at 156 by first dissolving the nonpolymeric salt in de-ionized water to form a salt solution. The PAA salt in granular form is added to the salt solution with rapid stirring. The PAA salt swells to a gel with the nonpolymeric salt being encompassed by the PAA salt such that the nonpolymeric salt occurs throughout the polymeric network of the PAA salt.

Once absorption of water by the PAA salt has stopped, the gel is dried 157 at approximately 100° C. to a moisture level of less than about 5%, and typically, less than about 3%. The dried mixture is then ground or crushed 158. In a commercial process, a ball mill is used to grind the mixture. The ground mixture is classified 160 and then packaged 162.

The PAA salt and the nonpolymeric salt may also be dry blended. As an example, 200 milligrams of dry potassium bicarbonate (anyhydrous) was mixed with 800 milligrams of K-PAA. The dry mixture was stirred and ground with a mortar and pestle. The same procedure was used to mix potassium carbonate with K-PAA and anhydrous $Na_2SO_4$ with Na-PAA to form suitable desiccants.

Figure 3:
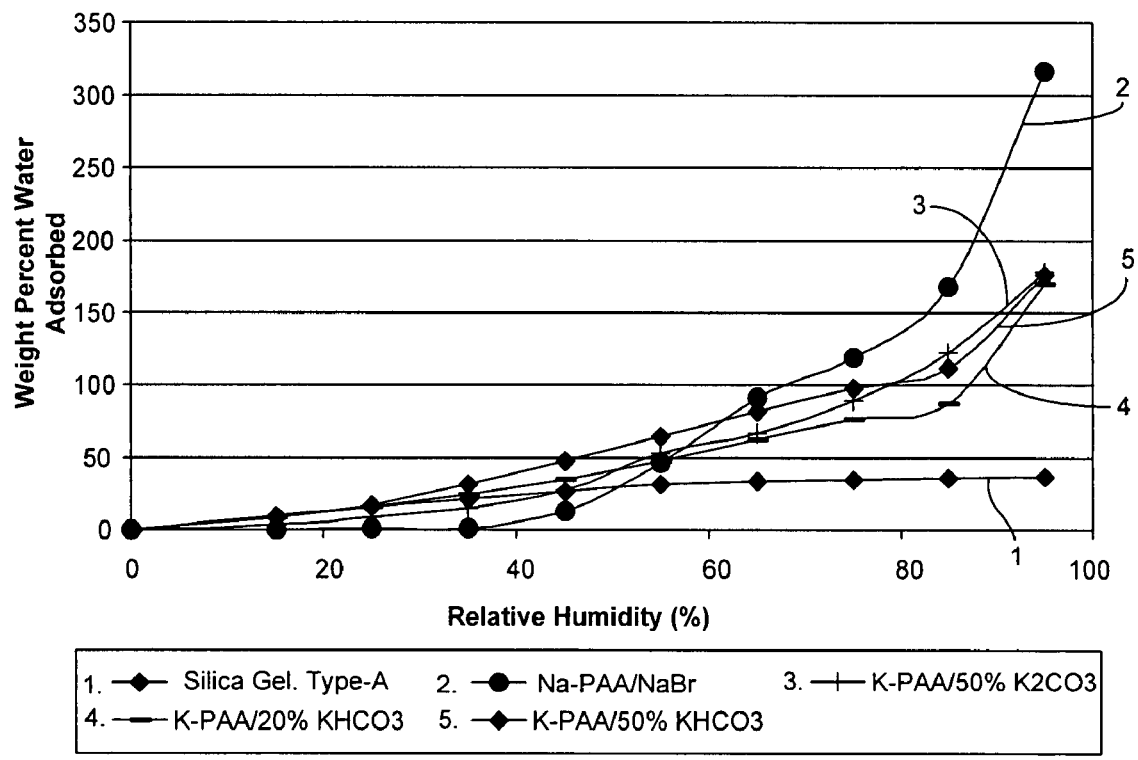
FIG. 3 is a graphical view illustrating water adsorption isotherms of desiccants of the present invention.

It has been found that when the PAA salt is combined with a nonpolymeric salt that has the same cation (the same metal ion) that such combination produces the features of the present invention. The desiccant of this invention holds humidity at a constant level for long periods of time when compared to other desiccants such as silica gel as illustrated in FIG. 3. The desiccant also has the ability to absorb more moisture while keeping humidity levels constant.

It is believed, although not to be held to such theory, that using a salt having a cation different than the cation of the PAA salt may result in the cation of the PAA salt being displaced over time by the cation of the nonpolymeric salt, thereby changing the adsorption properties of the PAA salt. Therefore, to keep the cation of the PAA salt from being displaced, the nonpolymeric salt should have the same cation.

Another consideration in choosing the cation of this invention is that the nonpolymeric salt does not have any deleterious effects on the instrument, housing or other components within the area whose humidity is being controlled. For example, if the instrument contains polycarbonate components such as a polycarbonate housing that houses the desiccant, a high concentration of a carbonate salt may not be suitable since the carbonate salt may promote degradation of the housing. Carbonate salts, specifically $KHCO_3$ and $K_2CO_3$, react to produce high levels of OH specifically $K_2CO_3$ does so as follows:

$$K_2CO_3 + H_2O \Leftrightarrow 2K^+ + CO_3^{-2}$$

$$CO_3^{-2} + H_2O \Leftrightarrow HCO_3^- + OH^-$$

High levels of $OH^-$ will raise the pH to about 11 to 13. For example, a concentrated solution of $K_2CO_3$ is about pH 11. Hot basic solutions will hydrolyze a polycarbonate desiccant housing of a disc drive and therefore high $K_2CO_3$ or $HCO_3^-$ concentrations should be avoided if the desiccant will come into contact with polycarbonate. Ester linkages in polymers such as polyesters and polycarbonate may be subject to hydrolysis under adverse pH conditions. For example, tests were run on a polycarbonate housing for more than 4 days in duration at 80° C. at 80% relative humidity showed that polycarbonate housing had degraded due to hydrolysis of the ester/carbonate bonds in the polycarbonate.

Typical commercial K-PAA and Na-PAA are neutralized to about 70 or 80% of the free acidic groups in the polymer. In the present invention, the addition of the non-polymeric salts $K_2CO_3$ or $KHCO_3$ to the K-PAA salt or $Na_2CO_3$ or $NaHCO_3$ to a Na-PAA salt in substantially the right proportion (approximately 20% by weight in the samples tested or in stochiometric excess) results in neutralizing substantially all of the remaining acidic functional groups in the PAA salt. The resulting pH of the neutralized desiccant is approximately neutral or 7. A neutral pH is useful in protecting polycarbonate polymer based components in electronic instruments. When neutralized desiccants were tested in polycarbonate housings at 80° C. at 80% relative humidity for as long as 10 days, the polycarbonate housing was not degraded or hydrolyzed.

Polycarbonate is commonly used for housing electronic instruments. Polycarbonate is easily molded, clean and inexpensive when compared to other polymers such as polyphenyl sulfide and liquid crystal polymers.

Each salt has an associated characteristic relative humidity at a given temperature. The salts of the present invention have been chosen to maintain a relative humidity below 60%. A typical desirable range of relative humidity over the long-term in the electronic instruments described herein is between about 10% and 60%.

Salts that are useful in the present invention include, but are not limited to, the salts of $Li^+$, $K^+$, $Na^+$, $Cs^+$, $Rb^+$, salts of $F^-$, $Br^-$, $Cl^-$, $I^-$, $HCO_2^-$ (formate), $CH_3COO_2^-$ (acetate), $C_2O_4^{-2}$ (oxylate), $HCO_3^-$ (bicarbonate) and $CO_3^{-2}$ (carbonate).

Figure 4:
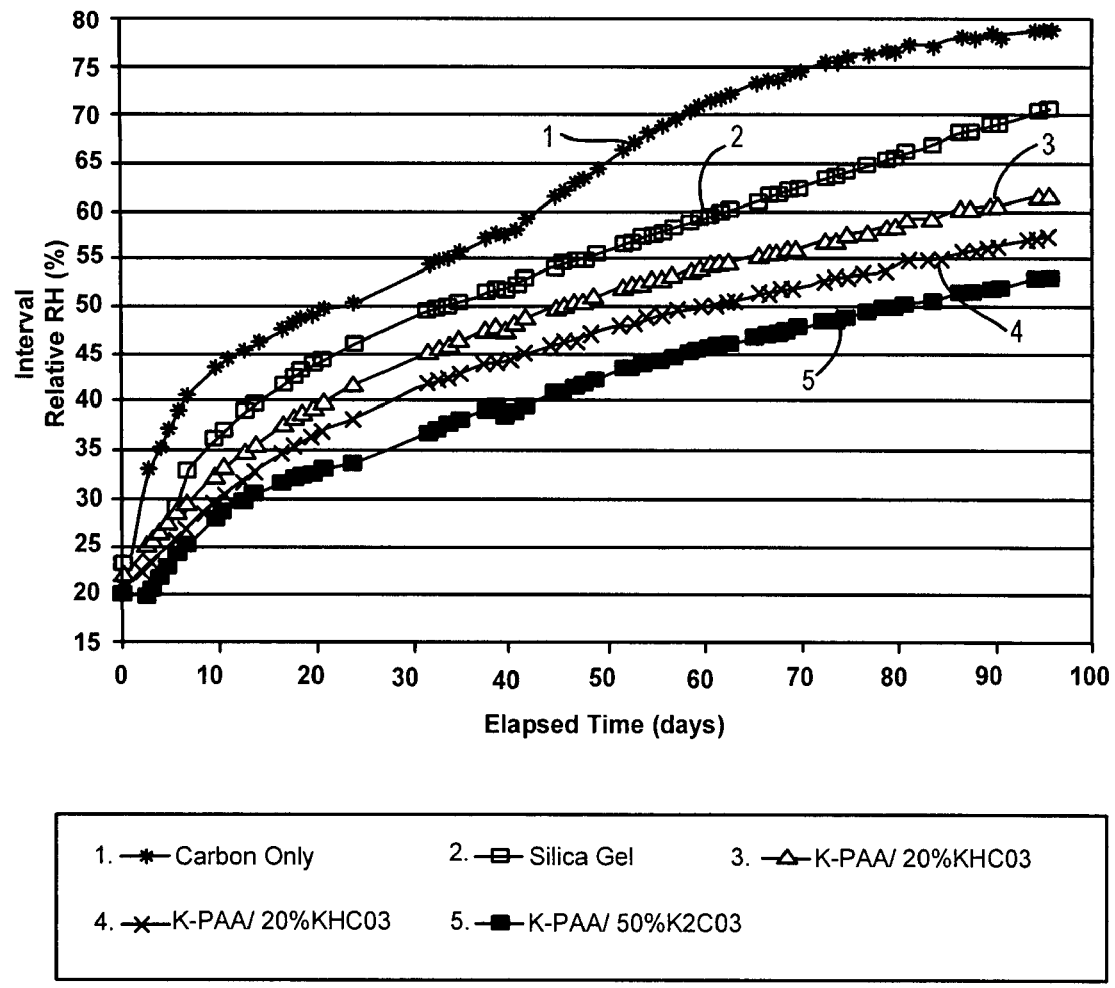
FIG. 4 is a graphical view illustrating the range of relative humidity maintainable over time.

By choosing an appropriate cation the relative humidity within an electronic instrument can be controlled within a specified range. For example, knowing the equilibrium humidity levels for a saturated aqueous solution of a selected salt, incorporating the cation of that salt into a desiccant polymer of the present invention along with the selected salt in combination as discussed above, a selected relative humidity range can be maintained over the long-term. Matching the cation of the non-polymeric salt with the cation of the polymeric salt insures that the relative humidity level characterized by the chosen salt will be maintained in the electronic instrument. FIG. 4 shows a graph of relative humidity over time comparing desiccants of this invention to silica gel and activated carbon.

Combinations of suitable PAA salts and nonpolymeric salts for use in the present invention are set forth in the table below:

| PAA Salt | Nonpolymeric Salt | Wt % of Nonpolymeric Salt |
|---|---|---|
| K-PAA[1] | $KHCO_3$ | 10-60 |
| K-PAA[1] | $K_2CO_3(1.5H_2O)$ | 10-60 |
| K-PAA[1] | $HCO_2K^{2,3}$ | 30-60 |

-continued

| PAA Salt | Nonpolymeric Salt | Wt % of Nonpolymeric Salt |
|---|---|---|
| K-PAA[1] | KOH | 10-60 |
| K-PAA[1] | $CH_3CO_2K$[3] | 10-60 |

[1]K—BASF's Aridall-1460 available from BASF Aktiengesellschaft of Germany, Luquasorb 1270, or Luquasorb 1280, available from ChemPoint.com of Bellevue, Washington.
[2]Potassium Formate ($HCO_2K$) may have 0 to 20% $K_2CO_3(1.5H_2O)$ or $KHCO_3$ added.
[3]May be combined with $KHCO_3$ or $K_2CO_3(1.5H_2O)$ at 2 to 20% to reduce pH.

Other combinations of polymeric salts and nonpolymeric salts (each having the same cation) that have been tested and have shown satisfactory results at approximately a 50% level of nonpolymeric salt include:

| PAA Salt | Nonpolymeric Salt |
|---|---|
| Na-PAA[1] | NaBr |
| Na-PAA | NaCl |
| Na-PAA | $NaHSO_4$ |
| Li-PAA | LiCl |
| Li-PAA | LiBr |

[1]LiquiBlock 44-OC, Norsocryl D-60, LiquiBlock AT-03S, Norsocryl S-35 Na, or LiquiBlock 88HS available from Emerging Technologies, Inc. of Greensboro, North Carolina.

The present invention is more particularly described in the following Examples which are intended for illustrative purposes only since numerous modifications and variations may be made within the scope of the present invention.

EXAMPLE 1

In this Example, a desiccant was made from a mixture of sodium polyacrylic acid and sodium bromide.

Initially 1 gram of sodium bromide was mixed with 1 milliliter of de-ionized water. Then 1 gram of sodium polyacrylic acid was added to the sodium bromide solution by rapid stirring. A gel resulted which was then dried at approximately 100° C. to less than 2% moisture content. The dried gel was then ground to a particulate.

The resulting particulate desiccant was subjected to 4 cycles of adsorption and corresponding cycles of drying or desorption without losing its desiccant characteristics.

EXAMPLE 2

In this example, desiccant was made from a mixture of potassium polyacrylic acid (K-PAA) and lithium chloride.

To exchange/displace the potassium and convert the K-PAA to Li-PAA, excess LiCL was added several times. Initially, 10 grams of lithium chloride and 3 grams of potassium polyacrylic acid were stirred in one liter of water overnight (8 hours). The mixture was allowed to settle and then was filtered.

To the filtrate was added 10 grams of lithium chloride and one liter of water and this solution was stirred overnight (8 hours). The mixture was allowed to settle and the water was separated leaving a filtrate.

To this filtrate another 10 grams of lithium chloride was added and the filtrate was placed in one liter of water and again stirred overnight (8 hours). The solution was filtered, removing the water and leaving a filtrate.

To this filtrate, 2 grams of lithium chloride and 5 milliliters of water was added and stirred. The solution was placed in an oven at 85° F. overnight. The resulting dried compound was then ground to a particulate. The resulting desiccant exhibited excellent adsorption for numerous cycles of drying and adsorption without losing its desiccant characteristics.

Although the present invention has been described with reference to preferred embodiments, workers skilled in the art will recognize that changes may be made in form and detail without departing from the spirit and scope of the invention.

What is claimed is:

1. An electronic instrument in which the relative humidity is controlled, the instrument comprising:
   a housing and electronic components positioned therein; and
   a mixture of a polymeric salt and a nonpolymeric salt within the instrument to function as a desiccant,
   wherein the polymeric salt and the nonpolymeric salt have the same cation.

2. The electronic instrument of claim 1 wherein the polymeric salt is a salt of polyacrylic acid.

3. The electronic instrument of claim 1 wherein the cation is a metal ion.

4. The electronic instrument of claim 3 wherein the metal ion is either Lithium, Sodium, or Potassium.

5. The electronic instrument of claim 1 wherein the polymeric salt is a Sodium salt and the nonpolymeric salt is NaBr.

6. The electronic instrument of claim 1 wherein the polymeric salt is Potassium and the nonpolymeric salt is either $KHCO_3$, $K_2CO_3$ or $HCO_2K$ or any combination thereof.

7. The electronic instrument of claim 1 wherein the instrument is a disc drive.

8. The electronic instrument of claim 1 wherein the nonpolymeric salt is a salt of $Li^+$, $K^+$, $Na^+$, $Cs^+$, $Rb^+$, or a salt of $F^-$, $Br^-$, $Cl^-$, $I^-$, $HCO_2^-$, $CH_3CO_2^{-2}$, $C_2O_4^{-2}$, $HCO_3^-$ and $CO_3^{-2}$.

9. The electronic instrument of claim 1, wherein the nonpolymeric salt is present from about 10 wt % to about 60 wt %.

10. The electronic instrument of claim 1, wherein the nonpolymeric salt is present at about 20 wt %.

11. A method of controlling relative humidity in an electronic instrument, the electronic instrument including a housing and electronic components positioned within the housing, the method comprising:
    positioning a mixture of a polymeric salt and a nonpolymeric salt within the instrument to function as a desiccant, wherein the polymeric salt and the nonpolymeric salt have the same cation.

12. The method of claim 11 wherein the polymeric salt is a salt of polyacrylic acid.

13. The method of claim 11 wherein the cation is either Lithium, Sodium, or Potassium.

14. The method of claim 11 wherein the polymeric salt is a Sodium salt and the nonpolymeric salt is NaBr.

15. The method of claim 11 wherein the polymeric salt is Potassium and the nonpolymeric salt is either $KHCO_3$, $K_2CO_3$ or $HCO_2K$ or any combination thereof.

16. The method of claim 11 wherein the nonpolymeric salt has an associated characteristic relative humidity at a given temperature, and the nonpolymeric salt is chosen based on such associated characteristic relative humidity in relation to the humidity level to be maintained in the electronic instrument.

* * * * *